United States Patent [19]
Sekine et al.

[11] Patent Number: 5,289,318
[45] Date of Patent: Feb. 22, 1994

[54] OPTICAL APPARATUS PROVIDED WITH A DRIVING UNIT FOR MOVING A LENS

[75] Inventors: Masayoshi Sekine, Tokyo; Junichi Murakami, Atsugi; Shigeru Ogino, Tokyo; Hiroyuki Takahara, Yokohama; Masamichi Toyama, Yokohama; Sadahiko Tsuji, Yokohama; Shigeyuki Suda, Yokohama; Jun Tokumitsu, Sagamihara, all of Japan

[73] Assignee: Canon Kabushiki Kaisha, Tokyo, Japan

[21] Appl. No.: 737,149

[22] Filed: Jul. 29, 1991

[30] Foreign Application Priority Data

| Jul. 31, 1990 | [JP] | Japan | 2-202817 |
| Jul. 31, 1990 | [JP] | Japan | 2-202818 |
| Aug. 3, 1990 | [JP] | Japan | 2-206593 |
| Apr. 24, 1991 | [JP] | Japan | 3-94371 |

[51] Int. Cl.$^5$ .............................. G03B 3/00
[52] U.S. Cl. .............................. 359/813; 359/814
[58] Field of Search ........... 359/694, 699, 700, 823, 359/824, 695, 696, 694–699, 823, 824, 814, 813; 369/44.15, 44.16, 44.11, 44.12, 44.13, 44.14, 44.19, 44.17, 44.18

[56] References Cited

U.S. PATENT DOCUMENTS

| 4,639,084 | 1/1987 | Kugioka | 359/824 |
| 4,749,269 | 6/1988 | Nakashima et al. | 359/696 |
| 4,785,210 | 11/1988 | Maruyama et al. | 359/696 |
| 4,862,441 | 8/1989 | Yumura et al. | 369/44.15 |
| 5,146,071 | 9/1992 | Ookubo et al. | 359/698 |

FOREIGN PATENT DOCUMENTS

| 0458694 | 11/1991 | European Pat. Off. |
| 57-108806 | 7/1982 | Japan |
| 58-16208 | 1/1983 | Japan |
| 59-198409 | 11/1984 | Japan |
| 0209937 | 10/1985 | Japan | 369/44.15 |
| 62-75409 | 4/1987 | Japan |
| 63-007525 | 1/1988 | Japan |
| 63-163312 | 7/1988 | Japan |
| 1-188811 | 7/1989 | Japan |

Primary Examiner—Paul M. Dzierzynski
Assistant Examiner—Don Wong
Attorney, Agent, or Firm—Fitzpatrick, Cella, Harper & Scinto

[57] ABSTRACT

This specification discloses an optical apparatus provided with a lens unit movable in the direction of the optical axis thereof, a lens barrel, an electromagnetic coil coupled to one of the lens unit and the lens barrel, a driving unit having a magnetic material coupled to the other of the lens unit and the lens barrel, and a guide for slidably guiding the lens unit relative to the lens barrel.

10 Claims, 15 Drawing Sheets

F I G. 7
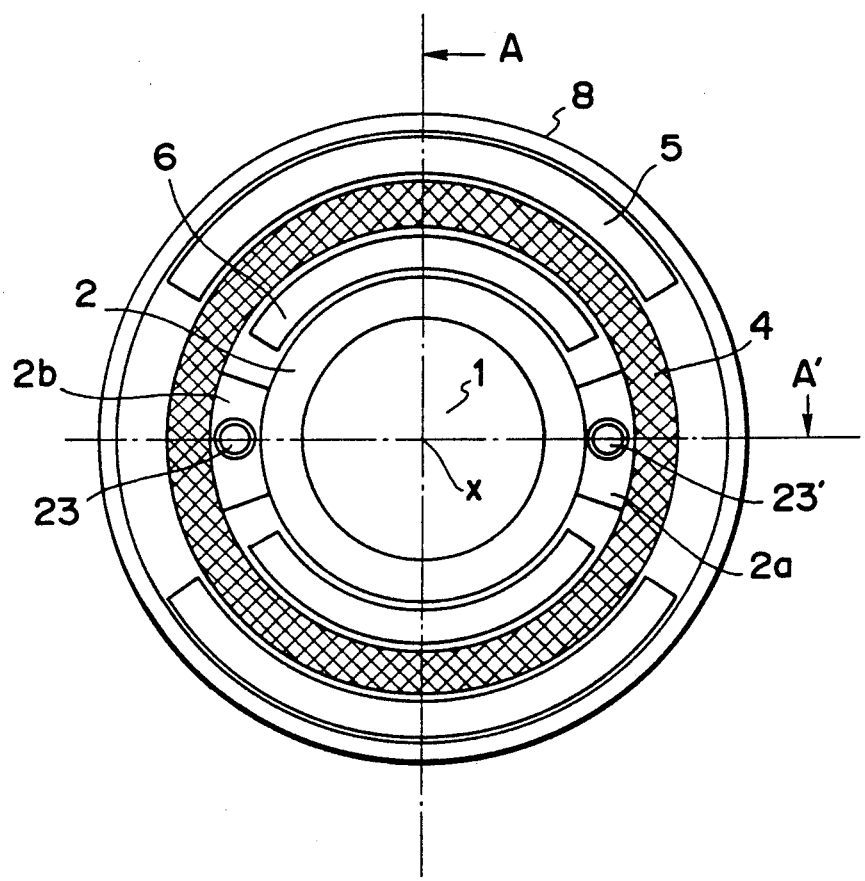

SECTION A-A'

OPTICAL APPARATUS PROVIDED WITH A DRIVING UNIT FOR MOVING A LENS

BACKGROUND OF THE INVENTION

1. Field of the Invention

The present invention relates to a phototaking system of a camera for silver salt film, a still video camera, a video camera or the like, and particularly to an optical apparatus provided with a driving unit for moving a lens unit for zooming or focusing or both in a portion of a lens barrel.

2. Related Background Art

It has heretofore been usual with the lens driving mechanism of a camera or the like to transmit the drive force of a motor by a driving mechanism such as a feed screw or a cam cylinder and a belt and a gear with the aid of a DC motor or a stepping motor to thereby move a focusing lens or a lens for zooming.

However, such example of the prior art has suffered from problems which will hereinafter be described.

Torque created by a DC motor or a stepping motor is generally a drive force in the direction of rotation, and to rectilinearly move a lens in the direction of the optic axis, members such as a feed screw and a cam have become separately necessary and it has been difficult to make a lens barrel compact.

Also, vibration and noise have been produced from the motor unit, and the gear unit and torque efficiency has been low, and this has given rise to a problem that much electric power is consumed.

On the other hand, the applicant has proposed in Japanese Laid-Open Patent Application No. 58-16208 a mechanism for rotating a lens holding cylinder helicoid-coupled to a body by the electromagnetic induction between the lens holding cylinder and the outer cylinder thereof to thereby move a lens unit back and forth, but loss of energy occurs in the helicoid-coupled portion and the movement still exists and the driving operation is performed in indirect manner.

SUMMARY OF THE INVENTION

It is an object of the present invention to provide a driving device which effects more direct lens driving and suppresses the wasteful consumption of electric power and can be incorporated into a small space, and it is a second object of the present invention to provide an optical apparatus incorporating the driving device therein.

It is another object of the present invention to provide an optical system incorporating therein a device capable of accurately measuring the position or the amount of movement of a lens.

The optical apparatus of the present invention is provided with a mechanism having an electromagnetic coil of which one end with respect to the optical axis of the lens portion is connected to the lens portion and a magnet and driving the lens portion by a force in the direction of the optical axis by the electromagnetic induction between the electromagnetic coil and the magnet. The magnet may desirably be a permanent magnet.

Further, in some cases, for example, the opposed surfaces of an electromagnetic coil or a bobbin and a magnet or a yoke constitute a guide mechanism for the lens portion, or for example, a straight guide mechanism provided with a bar and a sleeve is interposed between said opposed surfaces.

BRIEF DESCRIPTION OF THE DRAWINGS

FIG. 7 is a transverse cross-sectional view of a sixth embodiment of the present invention.

DETAILED DESCRIPTION OF THE PREFERRED EMBODIMENTS

Figure 1:
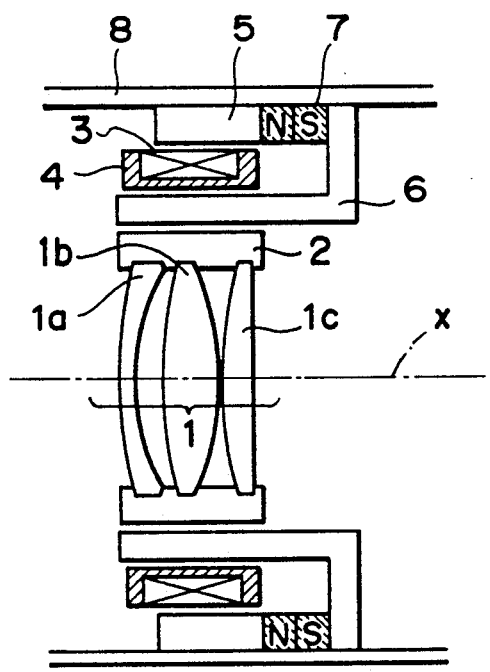
FIG. 1 is a vertical cross-sectional view showing a first embodiment of the present invention.
Figure 2:
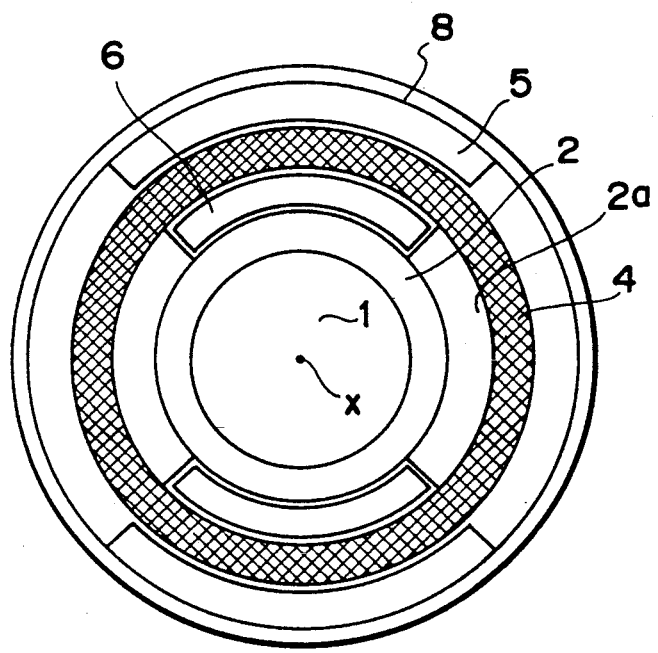
FIG. 2 is a front view of the first embodiment.
Figure 3:
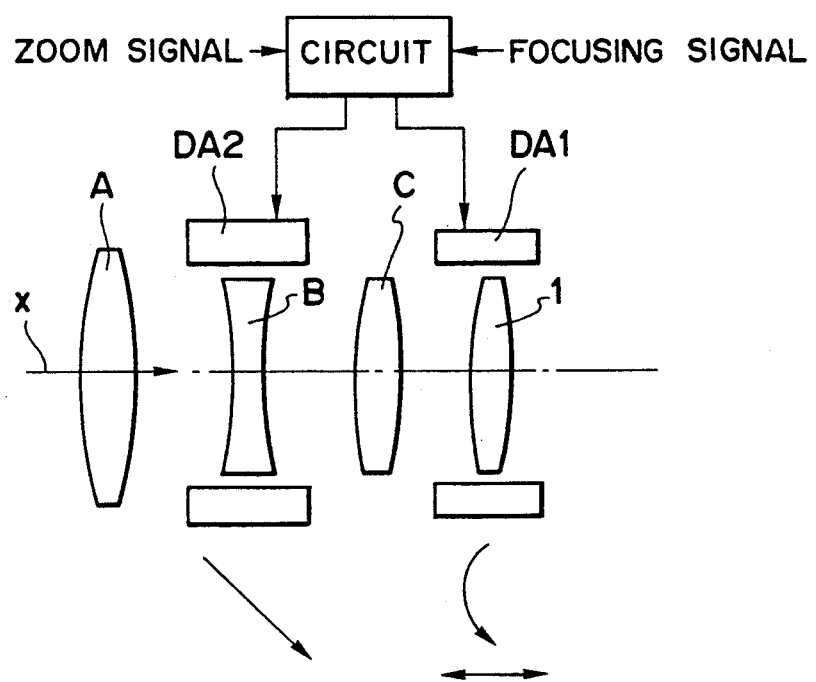
FIG. 3 shows a second embodiment in which the first embodiment is applied to an optical system.

FIG. 1 shows a cross-sectional view of an embodiment of the present invention, and FIG. 2 shows a view thereof as it is seen in the direction of the optical axis x. FIG. 3 shows an example of a zoom lens which comprises a positive forward lens unit A, a negative variator B, a fixed lens unit C and a positive movable lens unit 1 for compensation and focusing. This zoom lens can be applied to lenses of other various zoom types, and can also be applied to the focusing lens portion of a single-focus lens. In the following description, the application of a driving actuator DA1 to the lens unit 1 is adopted by way of example, but if as shown in FIG. 3, a driving actuator DA2 is also provided in the variator B and movement is effected at the same time, zooming will become possible.

It is to be understood that each of the lens units A, B and C comprises one or more single lenses.

In FIGS. 1 and 2, the reference numeral 1 designates a lens unit comprising elements 1a, 1b and 1c.

The reference numeral 2 denotes a lens holding cylinder for holding the lens unit 1. The reference numeral 3 designates a coil, and the reference numeral 4 denotes an annular bobbin. The coil 3 is wound on the bobbin 4 to thereby constitute an electromagnetic coil, and as shown in FIG. 2, the lens holding cylinder 2 and the bobbin 4 are coupled together in an area wherein a yoke 6 is absent, by an arm 2a for coupling.

The reference numeral 5 designates an outer yoke, and the reference numeral 6 denotes an inner yoke. These yokes extend in the direction of the optical axis from a permanent magnet 7. The outer yoke 5 and the permanent magnet 7 are coupled to a lens barrel 8. In that case, the bobbin 4 forms an annular band about the optical axis, and the inner yoke 6, the outer yoke 5 and accordingly the permanent magnet 7 form portions of the annular band.

In the present embodiment, the inner side of the bobbin 4 and the outer peripheral surface of the inner yoke 6 are polished, and these two contact with each other to constitute a plain bearing.

Also, a magnetic circuit is formed by the outer yoke 5, the inner yoke 6 and the permanent magnet 7. In the present apparatus, the lens, the coil and the yokes are coaxially disposed as described above.

The operation of the present apparatus will now be described. The electromagnetic coil comprising the coil 3 and the bobbin 4 is placed in a magnetic flux produced by the magnet 7, and an electric current is caused to flow from an electric wire, not shown, to the coil 3 in a selected direction, whereby the coil 3, the lens unit 1 and the lens holding cylinder 2 receive a driving force in the direction of the optical axis. At this time, the yokes which are disposed outside and inside form a closed magnetic circuit and the leakage flux is small and therefore, a relatively great driving force is produced by small electric power. Also, since the lens unit, the coil and the yokes are coaxially disposed, the driving force is uniformly applied to the cross-sections of the coil and the bobbin.

Further, the apparatus is of such structure that the movement of the lens is guided by the sliding surface between the bobbin 4 and the inner yoke 6, and in this straight guide mechanism as well, the elements are coaxially disposed and therefore, sliding friction also occurs uniformly in the cross-section of the coil.

Thus, both the driving force and the sliding frictions produced are axially-symmetrical with respect to the optical axis and therefore, there is created no force which inclines the lens surface.

Therefore, the lens is movable smoothly and at a high speed in the direction of the optical axis. Further, the lens holding cylinder and the constituents for driving force production and straight guide are made integral with each other, whereby the compactness and light weight of the lens barrel is realized.

In the embodiment of FIG. 1, in supplying electric power to the coil, the electromagnetic coil is of such structure that it slides between the edges of the arm 2a of the lens holding cylinder 2 and the yoke 6 in order to prevent the electromagnetic coil from rotating about the optical axis.

If a material of small coefficient of friction, for example, fluorine resin, is employed for the bobbin 4 of the present apparatus, the bobbin will become easier to move. Alternatively, a metal of strong magnetism may be used to increase torque. In this case, the use of a sintered metal of low coefficient of friction impregnated with a lubricant would also be effective.

Figure 4:
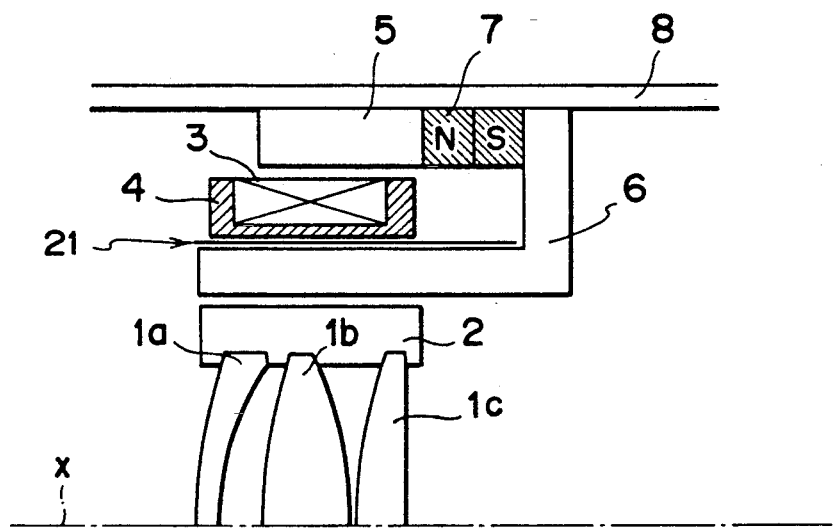
FIG. 4 is a vertical cross-sectional view of a third embodiment of the present invention.

In the structure shown in FIG. 4, a sheet-like lubricating member 21 is provided on the surface of contact between the bobbin 4 and the inner yoke 6 to mitigate the above-described friction.

FIGS. 4 and later depict the upper half above the optical axis x, and the lower half also is of symmetrical structure. The same members as those previously described are given the same reference numerals.

Figure 5:
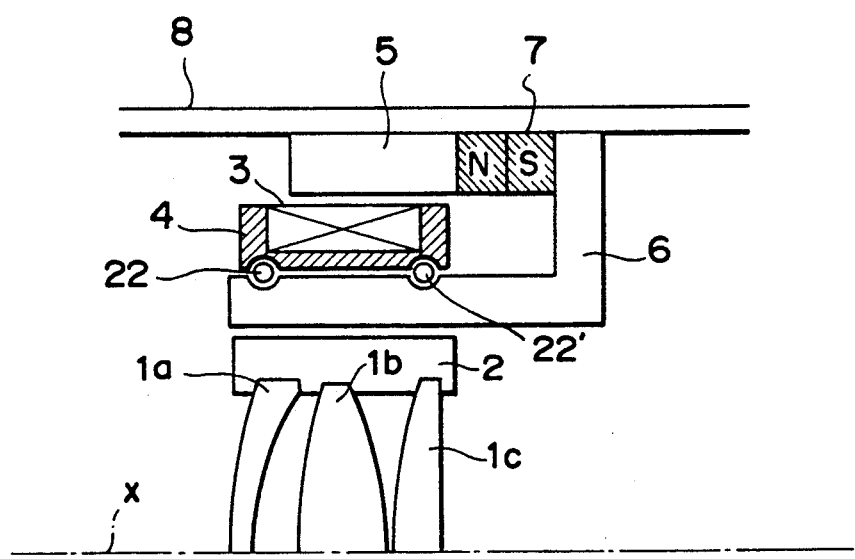
FIG. 5 is a vertical cross-sectional view of a fourth embodiment of the present invention.

An example of the case where ball bearings are discretely employed to decrease frictional resistance is shown in FIG. 5. In FIG. 5, the reference numerals 22 and 22' designate ball bearings disposed between the bobbin 4 and the inner yoke 6. One or both of the opposed surfaces of the bobbin 4 and the yoke 6 are formed with grooves in the direction of the optical axis to prevent the coil from rotating in the circumferential direction and at the same time, prevent the balls of the ball bearings from leaning toward a portion.

Figure 6:
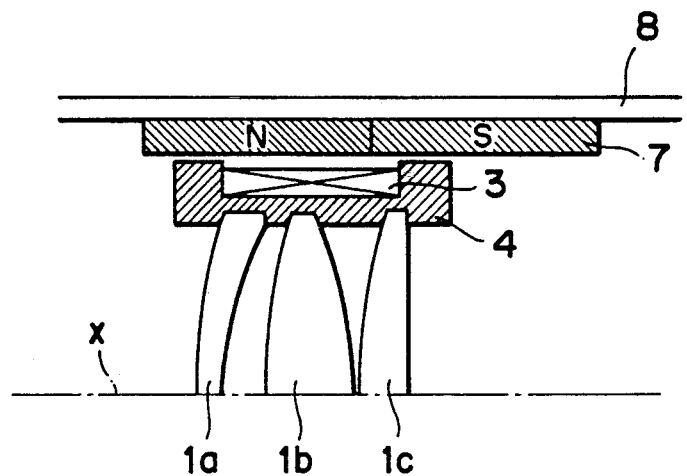
FIG. 6 is a vertical cross-sectional view of a fifth embodiment of the present invention.

FIG. 6 shows an example of a lens driving apparatus for guiding movement by the outer peripheral surface of the bobbin. The apparatus of this figure is comprised of members similar to those in FIG. 1, with the exception of the absence of the yokes 6 and 7. The direction of turn of the coil is similar to that in the first embodiment, and an elongated permanent magnet is disposed so that its polarities may split in the direction of the optical axis X as shown.

In this apparatus, when the coil 3 is electrically energized through a direction selecting switch, not shown, the magnetic field of the permanent magnet and the magnetic field of the coil 3 act to produce a force which moves the coil 3 in the direction of the optical axis. Also, the outer peripheral portion of the bobbin 4 contacts with the inner peripheral surface of the magnet 7 to thereby effect the rectilinear guide of the lens movement. The constructions of FIGS. 4 and 5 can also be adopted to decrease the friction of the surface of contact. In the construction of the present embodiment, a magnetic force is also produced in the radial direction, but since the lens 1, the coil 3 and the magnet 7 are coaxially disposed, the forces are balanced axially-symmetrically with optical axis X and it is difficult for a force which will incline the lens surface to be created.

In the construction of the present apparatus, the permanent magnet is not a closed magnetic circuit and therefore, the magnetic flux passing through the coil becomes small and torque efficiency is low as compared with the above-described embodiment, but there are the following effects.

Since the bobbin 4 and the lens holding member 2 are formed integrally with each other and the arm portion 2a need not be provided, it is easy to make these by integral molding. Also, the diameters of the bobbin, the coil and the yokes can be made smaller because of the absence of the arm portion 2a, and this leads to the effect that the lens barrel generally becomes compact.

Figure 8:
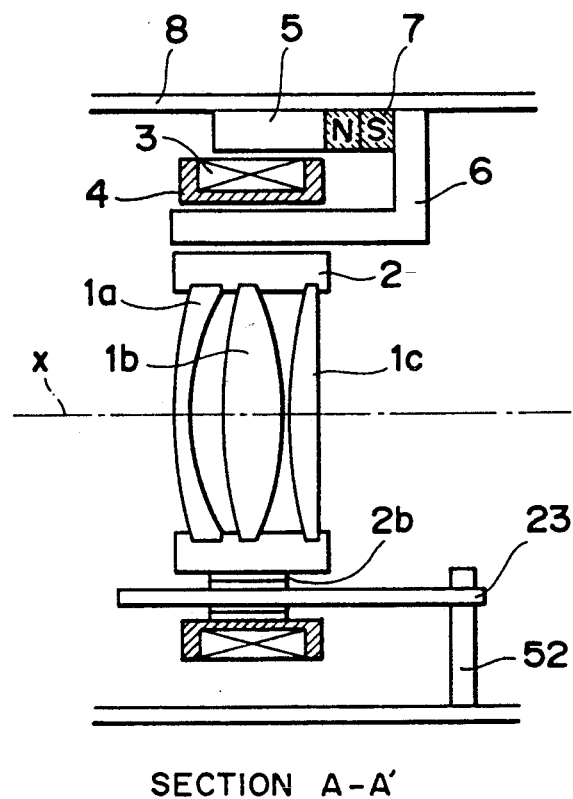
FIG. 8 is a vertical cross-sectional view of the sixth embodiment.

FIG. 7 shows another embodiment, and FIG. 8 depicts the plane A-x-A' of FIG. 7 as it is developed.

The present apparatus is characterized in that it has bars 23, 23' and the sleeve portion 2b of the holding cylinder 2 as a straight guide mechanism for the lens. This is particularly effective in a video camera of high image quality, where the eccentricity of the optical axis of the lens is suppressed highly accurately.

The bars 23 and 23' are fixed to the outer cylinder 8 in a direction parallel to the optical axis and mounted on a support member 52. The sleeve portion 2b can slide on these bars 50 and 51 and therefore, the lens unit 1 and the holding cylinder 2 and a member connected thereto are guided in the direction of the optical axis.

The principle of the driving force generation of the present apparatus is similar to that in the first embodiment, that is, by causing an electric current to flow to the electromagnetic coil 3, the holding cylinder 2 holding the lens unit receives a load in the direction of the optical axis. As previously described, these members are rectilinearly guided and can therefore be moved stably and smoothly in the direction of the optical axis.

In the present apparatus, the sleeve is made common to a portion of the lens holding cylinder, whereby the number of parts is decreased and the lens barrel is made compact.

Description will now be made of an embodiment in which the amount of movement or the stopped position of the moved lens can be detected. The detection is done to accurately know the position of the lens moved for zooming, or to confirm the amount of movement of the lens to be moved for focusing.

Figure 9A:
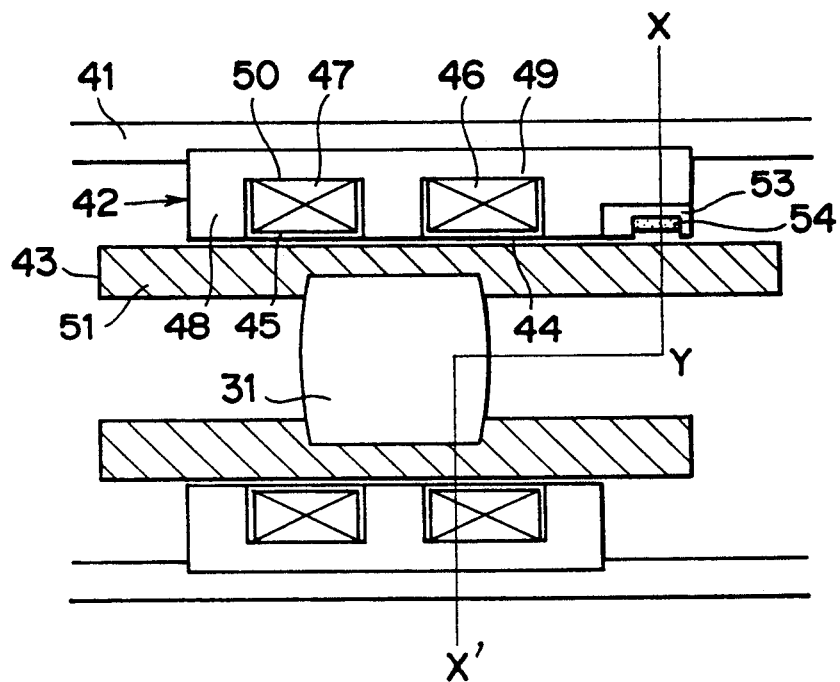
FIG. 9A is a vertical cross-sectional view of a seventh embodiment of the present invention.
Figure 9B:
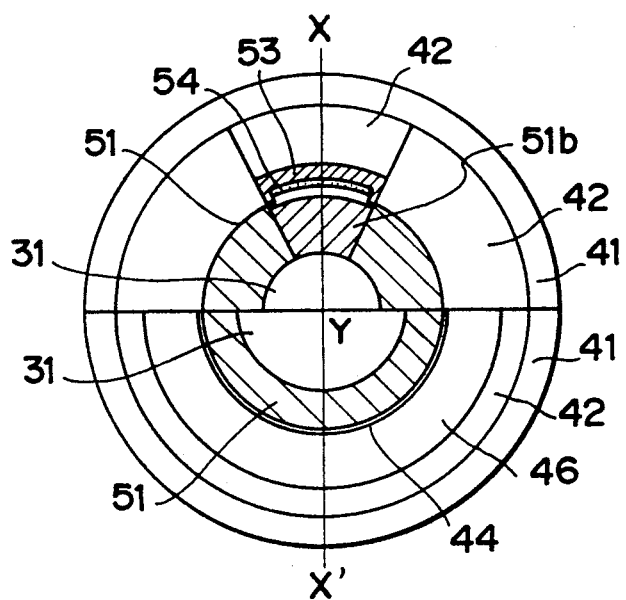
FIG. 9B is a cross-sectional view taken along line X-Y-X' of FIG. 9A.

FIG. 9A shows the vertical cross-section of a portion of the photo-taking lens, and FIG. 9B depicts the cross-section taken along the line X-Y-X' of FIG. 9A.

The lens driving unit comprises a fixed portion 42 of a hollow cylindrical shape fixed to a lens barrel 41, and a movable portion 43 slidable relative to the fixed portion 42. The fixed portion 42 has bobbins 44, 45, coils 46, 47 and a stator yoke 48. The bobbins 44 and 45 are provided on the opposite sides of the central pole of the stator yoke 48, and the coils 46 and 47 are wound along the peripheral surfaces of the bobbins 44 and 45, respectively, and a voltage may be applied thereto from terminals 49 and 50. The movable portion 43 has a lens 31 with a magnetized optical system holding member 51 disposed inside thereof. The magnetized optical system holding member 51 is, for example, a plastic magnet, and only a portion of the optical system holding member 51 may be magnetized. Alternatively, an iron piece may be adhesively secured to the outer peripheral surface of the optical system holding member 11 and the surface thereof may be Teflon-worked to make it readily slidable. The lens 31 is held by the optical system holding member 51. The fixed portion 42 and the movable portion 43 need not always be provided over the entire circumference.

The principle of operation of the lens driving unit of the present embodiment is similar to the principle of operation of an iron core type motor. The magnet 51 always produces constant magnetic fluxes $B_{M1}$ and $B_{M2}$, and constitutes a magnetic circuit so as to surround the coils 46 and 47.

When a DC voltage is applied to the terminals 49 and 50, an electric current flows to the coils 46 and 47, and a magnetic flux $B_C$ is produced by the coils 46 and 47. By changing the direction of the electric current, the direction of the magnetic flux $B_C$ can be changed. The magnetic fluxes $B_{M1}$ and $B_{M2}$ and the magnetic flux $B_C$ weaken or strengthen each other to thereby produce a thrust in one direction, and by this thrust, the movable portion 43, and hence, the lens 31, is slidden along the optical axis.

Figure 10:
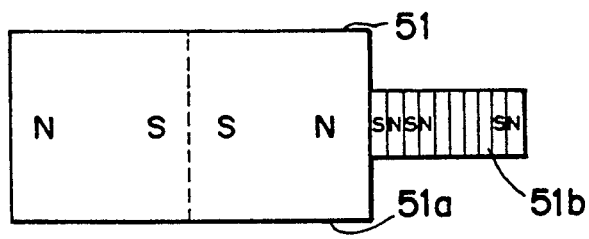
FIG. 10 is an illustration of constituent members.

One position detector is a magnetic encoder, and as shown in FIG. 10, a projected pole portion 51b is provided at one end of the optical system holding member 51, and a magnetic recording portion 51b multipole-magnetized in the direction of the optical axis is on the sliding surface of the projected pole portion 51b, and a magnetic sensor 54 is provided in the stator yoke 48 in opposed relationship with the magnetic recording portion 51b through a distance at which can be detected the leakage magnetic field from the magnetic recording portion 51b resulting from the sliding movement of the movable portion 43 in the direction of the optical axis. From the necessity of detection a weak leakage magnetic field from the magnetic recording portion 51b, the magnetic sensor 54 is provided in the stator yoke 48 in such a manner as to be surrounded through a non-magnetic member 53 to prevent the influence of the leakage magnetic fields of the magnet 51a and coils 46, 47 of the lens driving unit.

As previously described, the optical system holding member 51 serves as the optical system holding frame, the magnet of the lens driving apparatus and the magnetic recording portion of the posiiton detector, whereby the lens barrel can be made compact and light in weight as well as low in cost. Also, when carrying out the present invention, the movable portion 43 can be made long in the direction of the optical axis to thereby suppress the eccentricity thereof in the direction of the optical axis and thus, there can be provided a stable structure in which the fluctuation of the distance between the magnetic recording portion 51b and the magnetic sensor 54 is small. Thereby, there can be obtained a stable position detection signal of high accuracy.

Figure 11A:
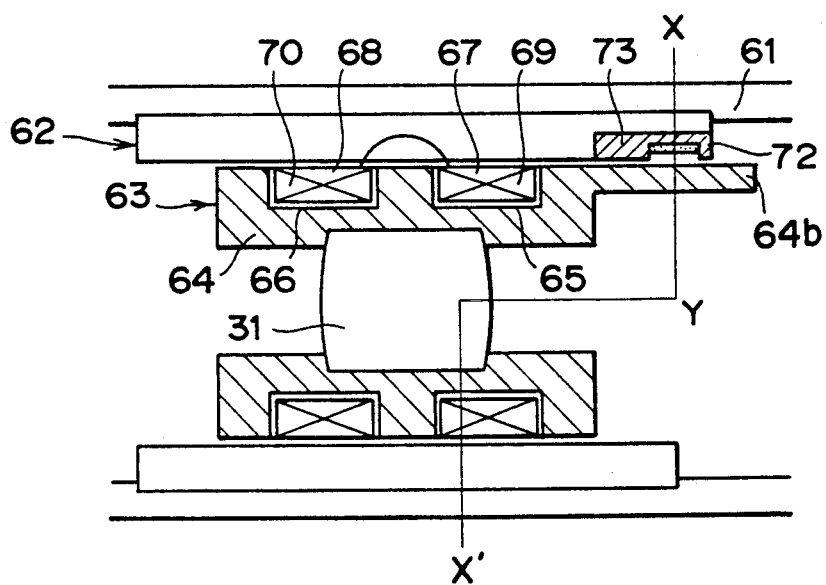
FIG. 11A is a vertical cross-sectional view of an eighth embodiment of the present invention.
Figure 11B:
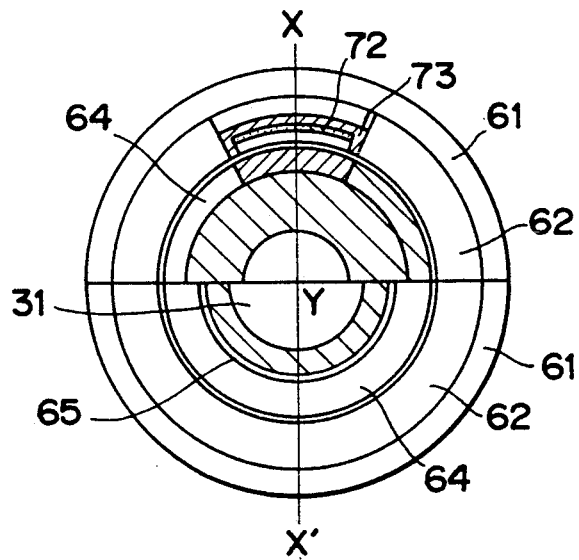
FIG. 11B is a cross-sectional view taken along line X-Y-X' of FIG. 11A.

A further embodiment of the present invention will now be described with reference to FIGS. 11A and 11B. This embodiment differs from the previous embodiment in that coils 67 and 68 are provided on a movable portion 63 and that a fixed portion is formed of a magnetic material.

That is, the lens driving unit comprises a fixed portion 62 of hollow cylindrical shape fixed to a lens barrel 61 and a movable portion 63 slidable relative to the fixed portion 62. The fixed portion 62 is formed of an iron piece, and the inner peripheral surface thereof is, for example, Teflon-worked to thereby make the movable portion 63 readily slidable. The movable portion 63 has bobbins 65, 66, coils 67, 68 and a yoke 64. The bobbins 65 and 66 are provided on the opposite sides of the central pole of the yoke 64, and the coils 67 and 68 are wound along the peripheral surfaces of the bobbins 65 and 66, respectively. The coils 67 and 68 are series-connected, and a voltage may be applied thereto from terminals 69 and 70. The yoke 64 is, for example, a plastic magnet, and serves also as an optical system holding member. The yoke 64 is entirely or partly magnetized, and constitutes a magnetic circuit so as to surround the coils 67 and 68. For example, the yoke 64 may be magnetized so that the central pole may be a north pole, the opposite end poles may be south poles, the diametrically outer peripheral side with respect to the central pole may be a north pole and the inner peripheral side may be a south pole.

The principle of operation of the present embodiment is similar to that of the previous embodiments, that is, similar to the principle of operation of an iron core type motor.

One position detector is a magnetic encoder, and a projected pole portion 64b is provided at one end of the yoke 64, and a magnetic recording portion multipole-magnetized in the direction of the optical axis is on the sliding surface of the projected pole portion 64b, and a magnetic sensor 72 is provided on the fixed portion 62 in opposed relationship with the magnetic recording portion through a distance at which can be detected the leakage magnetic field from the magnetic recording portion resulting from the sliding movement of the movable portion 63 in the direction of the optical axis. From the necessity of detecting a weak leakage magnetic field from the magnetic recording portion, the magnetic sensor 72 is provided on the fixed portion 62 in such a manner as to be surrounded through a nonmagnetic member 73 to prevent the influences of the leakage magnetic fields of the magnet 64a and coils 67, 68 of the lens driving unit.

As previously described, the yoke 64 serves as the optical system holding frame, the magnet of the lens driving apparatus and the magnetic recording portion of the position detector and thus, the compactness, light weight and low cost of the lens barrel can be achieved. Also, the movable portion 63 can be made long in the direction of the optical axis to thereby suppress the eccentricity in the direction of the optical axis and thus, there can be provided a stable structure in which the fluctuation of the distance between the magnetic recording portion 64b and the magnetic sensor is small. Thereby, there can be obtained a stable position detection signal of high accuracy.

While the above-described embodiments are of a construction in which the movable lens is guided in the direction of the optical axis by a guide member having a sliding surface, the following embodiment is such that the movable lens is supported by a resilient plate. The construction in which the movable lens is supported by a resilient plate is effective to decrease friction, but is not very suitable for great movement and therefore, is effective when it is used for the compensation and focusing of a zoom lens.

Figure 12:
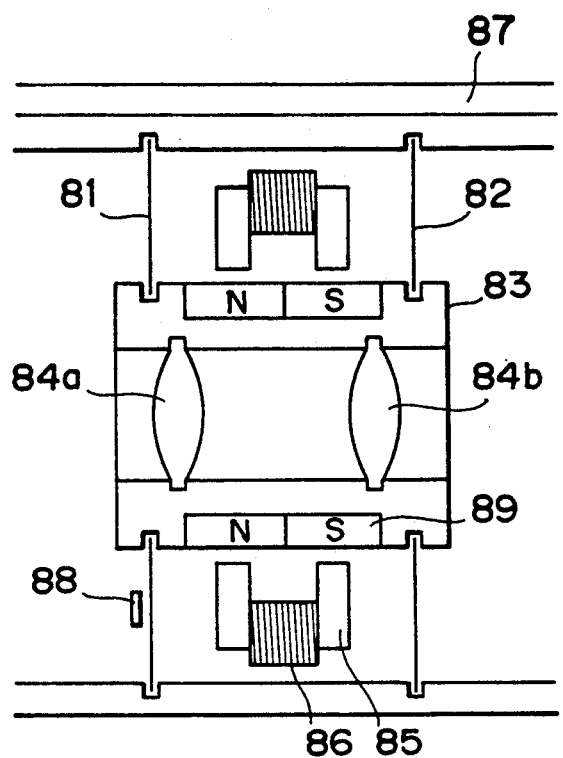
FIG. 12 is a vertical cross-sectional view of a ninth embodiment of the present invention.
Figure 13:
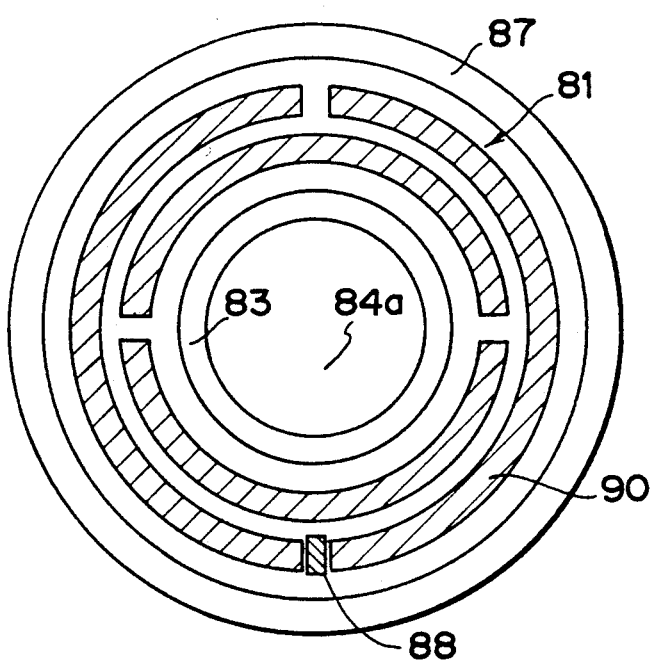
FIG. 13 is a front view of the ninth embodiment.

Referring to FIGS. 12 and 13, it is readily understood that a lens holding frame 83 is disposed in the outer cylinder 87 of a lens barrel and lenses 84a and 84b are fixed to the holding frame 83.

Figure 14:
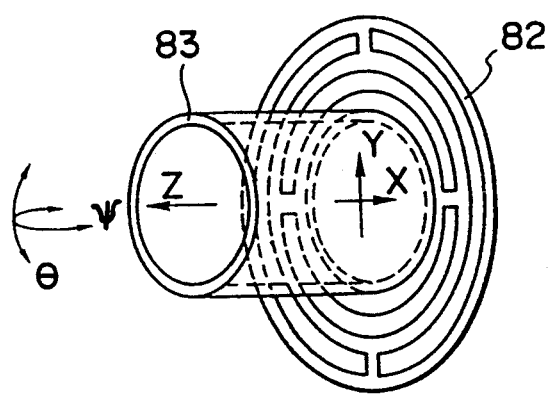
FIG. 14 illustrates the action of a gimbal spring.
Figure 15A:
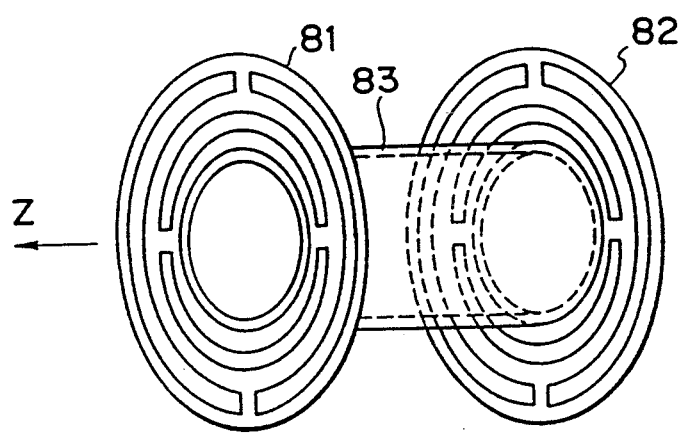
FIGS. 15A and 15B illustrate the axial deformation of the gimbal spring.
Figure 15B:
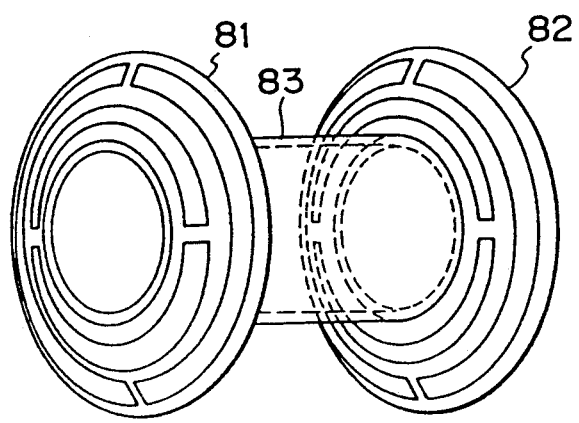

The lens holding frame 83 is supported in the outer cylinder 87 of the lens barrel by two resilient flat plates, for example, gimbal springs 81 and 82. The resilient flat plates 81 and 82, as shown in FIG. 13, have concentric cut-out portions 90 indicated by hatching. Accordingly, where a single resilient flat plate is used as shown in FIG. 14, the holding frame 83 moves freely in directions z, θ and Ψ shown. However, it is held in directions x and y with a relatively strong force. So, if two resilient flat plates are disposed parallel to each other as shown in FIG. 15A and the lens holding frame 83 is fixed thereto, the holding frame 83 will become unmovable or unrotatable in the directions x, y, θ and Ψ and movable only in the direction z. FIG. 15A shows a case where the resilient flat plates 81 and 82 are balanced, and FIG. 15B shows a state in which the holding frame 83 has been moved in the direction z.

A permanent magnet 89 far driving the lens holding frame 83 in the direction of the optic axis is fixed to or embedded in the outer peripheral portion of the holding frame 83. Or it is magnetized. Also, an electromagnet comprising an iron core 85 and a coil 86 wound thereon is disposed correspondingly to the permanent magnet 89.

The resilient flat plates 81 and 82 are formed, for example, from phosphor bronze or stainless steel plate by etching, or are inexpensively made of plastic molded articles, and a strain gauge 88 which is movement distance detecting means is attached to a portion thereof.

The present embodiment is constructed as described above and therefore, when the coil 86 is electrically energized, a magnetic field is produced around the iron core 85, and by varying that electrically energized state, i.e., the polarity of the electromagnet, there are produced attraction and a repulsive force between the electromagnet and the permanent magnet 89. Therefore, the holding frame 83 to which the permanent magnet 89 is fixed obtains a driving force relative to the outer cylinder 87 and moves in the direction of the optical axis. Accordingly, the lenses 84a and 84b are moved in the direction of the optical axis and focusing or the adjustment of the focal lengths of these lenses can be accomplished. Also, the strain gauge 88 is attached to each resilient flat plate and therefore, when the holding frame 83 moves in the direction of the optical axis, the amount of deformation of the resilient flat plate 81 can be directly detected, and it is possible to convert this detected value to thereby detect the amount of movement of the lens in the direction of the optical axis.

Figure 16:
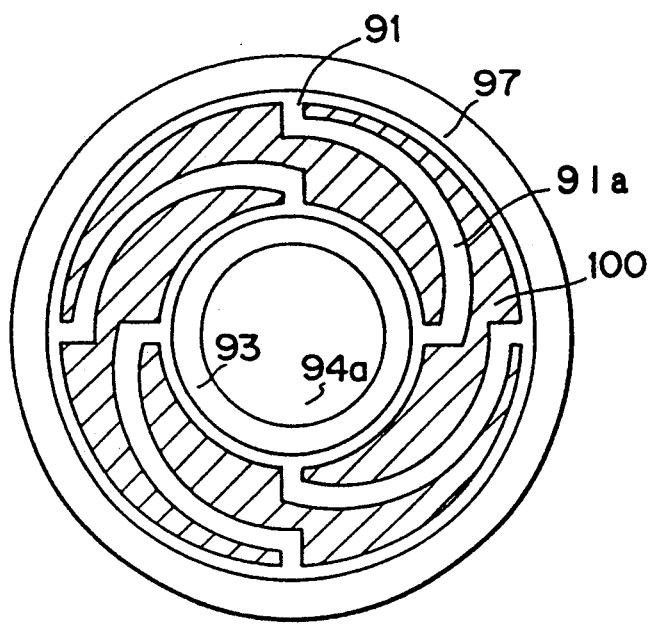
FIG. 16 is a front view of a modification of the gimbal spring.

FIG. 16 shows another embodiment of the resilient flat plate. According to this embodiment, cut-out portions 100 indicated by hatching are formed in an eddy-like shape, that is, are cut out in such a manner that the diameter thereof becomes progressively larger. The resilient flat plate of the present embodiment is also used in the same manner as the flat plate shown in FIG. 12 and has a similar effect, but according to the present embodiment, an arm portion 91a subjected to deformation is longer than that of FIG. 13 and therefore, the lens can be moved with a light driving force and thus, less electric power is required of the actuator.

Figure 17:
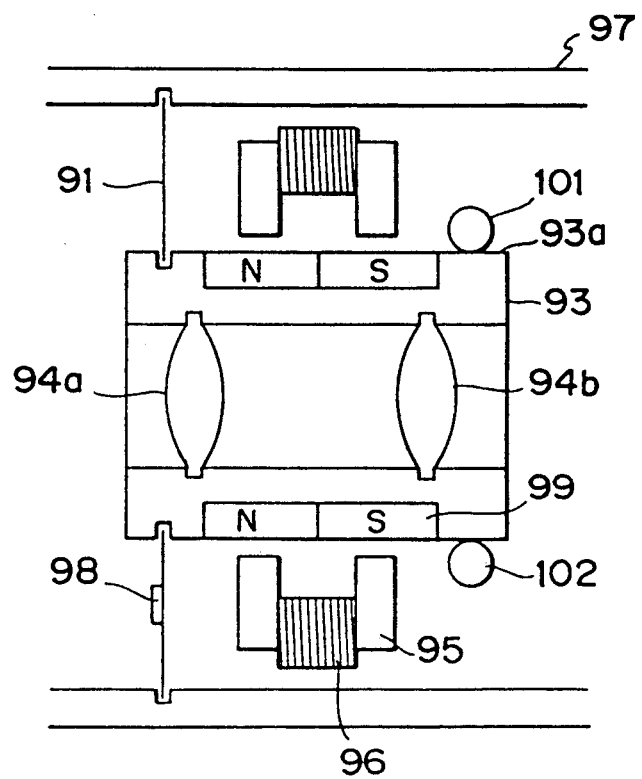
FIG. 17 is a vertical cross-sectional view of a tenth embodiment of the present invention.

FIG. 17 shows an embodiment in which a single resilient flat plate is used. That is, a lens holding frame 93 is supported at one end thereof by a resilient flat plate 91 and the outer periphery 93a of the other end portion thereof is axially movably supported by a plurality of guide rollers 101 and 102.

According to the present embodiment, the movements of the lens holding frame 93 in the aforementioned directions θ and Ψ are restricted by the guide rollers 101 and 102 and therefore, as in the embodiment using two resilient flat plates, the holding frame 93 is movable only in the direction of the optical axis.

The other constituents are given the same reference characters and need not be described. Although not shown, it is apparent that the guide rollers can be replaced by guide pins, bar sleeves or the like.

In the embodiments shown in FIGS. 12 and 13, a strain gauge is used to detect the position or the amount of movement. The strain gauge is known as what measures strain by utilizing the nature that the resistance value of a semiconductor varies when strain is exerted on the semiconductor.

In a compact rear focus type zoom lens, the lens positioning accuracy required is high and for example, with the 8-time zoom for 113' CCD image pickup element, it is sometimes the case that even a detection resolving power of the order of several microns is required. Also, in the auto focusing of the type in which in-focus state is judged from an image signal, a mechanism for vibrating a portion of the lens at a high speed in the direction of the optical axis (wobbling) is required and therefore, high detection responsiveness is desired.

Figure 18:
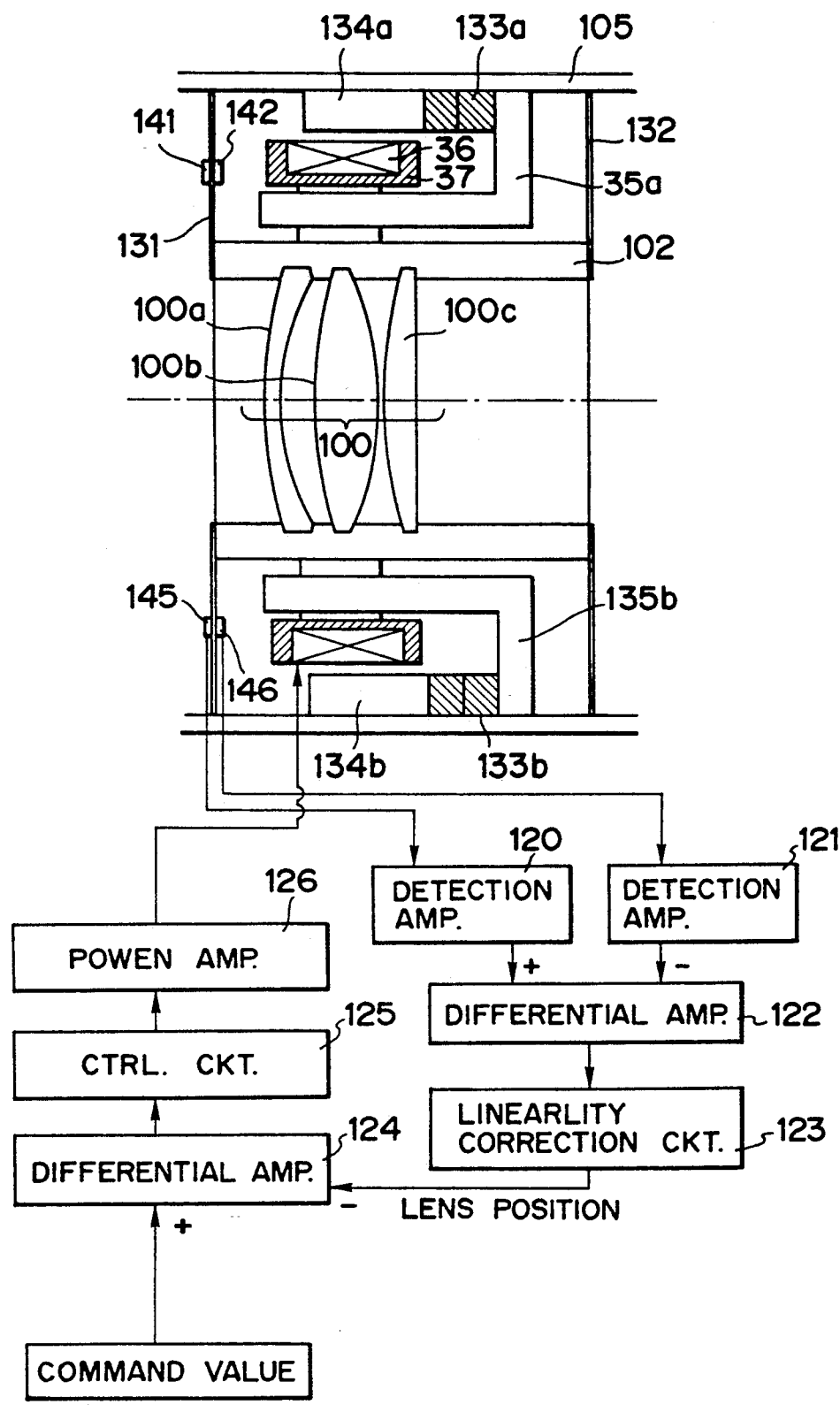
FIG. 18 shows the assembly of a mechanical system and an electrical system according to an eleventh embodiment of the present invention.

The following embodiment provides a construction in which highly accurate detection is possible. FIG. 18 shows a construction in which the lens holding cylinder of the embodiment of FIG. 1 is supported by the gimbal springs shown in FIGS. 14 and 15, instead of slidable bearings.

The reference numeral 100 designates a lens unit, and the reference characters 100a, 100b and 100c denote component lenses. The reference numeral 102 designates a holding cylinder, and the reference numeral 105 denotes an outer lens barrel.

Figure 19:
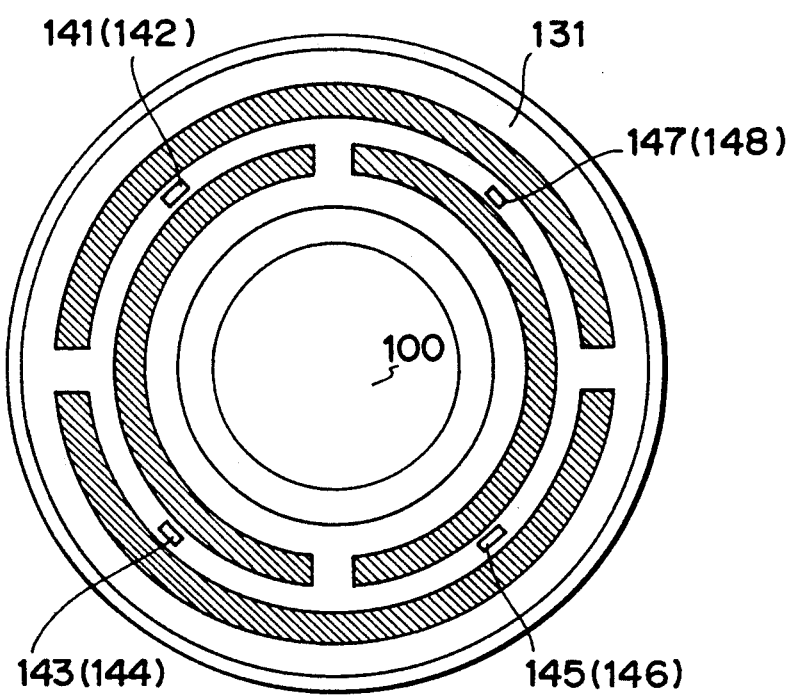
FIG. 19 is a front view of the eleventh embodiment.

The reference numerals 131 and 132 designate gimbal springs which, as shown in the front view of FIG. 19, are formed by punching a spring plate except for hatched portions, and the characteristic of the gimbal mechanism is such that the freedom of movement in forward and backward directions is given. The holding cylinder 102 has its force and rear portions supported on the lens barrel by the gimbal springs 131 and 132.

The reference characters 133a and 133b denote permanent magnets, each of which is formed by cutting out an annular shape by about a quarter of a circle and gluing a north pole and a south pole thereto, and the reference characters 134a, 134b and 135a, 135b designate inner and outer yokes, respectively. The reference numeral 37 denotes an annular bobbin, and the reference numeral 36 designates an electromagnetic coil.

On the other hand, the reference numerals 141 to 144 and 145 to 148 denote strain gauges.

The present embodiment is of such structure that the lens unit is directly moved by electromagnetic induction, and the voice coil type linear actuator of a closed magnetic system is constituted by the yokes 134a, 134b, 135a, 135b, the permanent magnets 133a, 133b and the coil 136.

The electromagnetic coil 36 is wound on the bobbin 37, which is coupled to the lens holding cylinder 102. As mentioned above, the inner band of a part of each of the gimbal springs 131 and 132 is coupled to the lens holding cylinder 102, and the outer edge thereof is joined to the lens barrel 105. Accordingly, by a combination of the gimbal springs 131, 132 and the holding cylinder, the lens unit can be rectilinearly guided only in the direction of the optical axis.

Also, when an electric current is supplied to the coil 36, the lens unit receives a driving force in the direction of the optical axis.

The structure as shown eliminates any space for sliding and the adverse effect of friction can be avoided and thus, highly efficient and rapid driving becomes possible.

On the other hand, in the present embodiment, the amounts of deformation of the gimbal springs are measured with the strain gauges 141 to 148 adhesively secured to four locations on orthogonal lines with the gimbal springs interposed between each pair of strain gauges on the front and back. The reason why the strain gauges are disposed at four locations is that consideration is given to a case where the deformation of the gimbal springs is not rotation-symmetrical, and basically, they may be disposed at one location or at each one location on orthogonal lines. However, to accomplish precise position detection, it is desirable to take the average of four sets, but the circuit is shown with respect to one set as an example.

In the signal processing system, the reference numerals 120 and 121 designate detection amplifiers connected to the strain gauges 145 and 146, respectively. The reference numerals 122 and 124 denote differential type amplifier circuits. The differential type amplifier circuit 122 is connected to the detection amplifiers 120 and 121. The reference numeral 123 designates a linearity correction circuit, the reference numeral 125 denotes a control circuit, and the reference numeral 126 designates a power amplifier circuit.

Basically, the strain gauges may be provided only on one side. However, a method of using a pair of strain gauges to offset the influence imparted to resistance value by a temperature change is adopted as a method for eliminating such influence, but this method is not restrictive. Also, in some cases, the gimbal springs are deformed by vibration to which the entire lens barrel has been subjected, whereby the resistance values of the strain gauges are varied. Accordingly, depending on the required performance, such a countermeasure may become necessary.

So, in the present embodiment, the strain gauges are disposed with the springs interposed therebetween, and the fact that the influence of the gauges and springs is symmetrical is utilized to detect the difference between outputs by the differential amplifier circuit 122, thereby eliminating the influences of temperature changes and the vibration of the entire lens barrel.

The output of the differential amplifier circuit 122 is converted into a signal indicative of the lens position by the linearity correction circuit 123 and the signal is output. By the above-described operation, the position of the lens unit on the optical axis has been found as an electrical signal.

Generally, the strain gauge is high in resolving power and also high in reproducibility because the element itself does not produce noise.

Accordingly, the position detection resolving power obtained by the present apparatus is of the order of $10^{-4}$–$10^{-5}$ mm, and this is a sufficient characteristic for the lens positioning of a camera.

Further, the element itself has no factor which will cause sliding or back-lash and therefore, is quick in detection response and does not affect the driving condition.

By using the circuits 124, 125 and 126 of FIG. 18, a lens driving system is formed in a closed loop, and it is also possible to construct a system which can rapidly accomplish positioning in response to a desired command value. Therefore, rapid wobbling or the like for auto focusing which uses, for example, the output of a solid state image pickup element is also possible.

Strain gauges of the semiconductor type have been taken as an example, but strain gauges utilizing piezoelectric elements may also be used. Also, as shown in FIG. 19, two or more sets of strain gauges may be provided and set so as to cancel vibrations in multiple directions. The strain gauges themselves may also be manufactured integrally with resilient springs as by etching.

What is claimed is:

1. An optical apparatus, comprising:
   a lens unit movable in a direction of optical axis thereof;
   a lens barrel;
   a driving means comprising one of (i) a combination of an electromagnetic coil coupled to said lens unit and a magnetic material coupled to said lens barrel, and (ii) a combination of said electromagnetic coil coupled to said lens barrel and said magnetic material coupled to said lens unit; and
   a guide for slidably guiding the lens unit relative to the lens barrel,
   wherein said electromagnetic coil is wound on a bobbin, a yoke extends from said magnetic material, and said guide comprises a surface of said yoke which is opposed to said bobbin, and a lubricative sheet between said bobbin and said yoke.

2. An optical apparatus, comprising:
   a lens unit movable in a direction of optical axis thereof;
   a lens barrel;

a driving means comprising one of (i) a combination of an electromagnetic coil coupled to said lens unit and a magnetic material coupled to said lens barrel, and (ii) a combination of said electromagnetic coil coupled to said lens barrel and said magnetic material coupled to said lens unit; and a guide for slidably guiding the lens unit relative to the lens barrel, said guide comprising a shaft and a journal bearing, said shaft being coupled to said lens barrel, said journal bearing being coupled to said lens unit.

3. An optical apparatus comprising:

a lens barrel;

a first lens unit movable in a direction of optical axis thereof;

a second lens unit movable in a direction of optical axis thereof;

a first driving unit for driving the first lens unit relative to the lens barrel by electromagnetic induction;

a second driving unit for driving the second lens unit relative to the lens barrel by electromagnetic induction;

a controller for controlling the first and second driving units to move the first lens unit and the second lens unit at the same time, wherein said first lens unit varies focal length of an objective lens, and said second lens unit compensates for the movement of image plane and is held in the lens barrel by a resilient member.

4. An optical apparatus, comprising:

a lens barrel;

a first lens unit movable in a direction of optical axis thereof;

a second lens unit movable in a direction of optical axis thereof;

a first driving unit for driving the first lens unit relative to the lens barrel by electromagnetic induction;

a second driving unit for driving the second lens unit relative to the lens barrel by electromagnetic induction;

a controller for controlling the first and second driving units to move the first lens unit and the second lens unit at the same time, wherein said first lens unit varies focal length of an objective lens, and said second lens unit compensates for the movement of image plane and is held in the lens barrel by a resilient member, said resilient member being a gimbal spring.

5. An optical apparatus, comprising:

a lens barrel;

a lens unit movable in a direction of optical axis thereof;

resilient members engaged with the lens barrel and the lens unit, respectively;

a driving unit for driving the lens unit relative to the lens barrel; and detecting means coupled to the resilient members to detect strain of the resilient members as a signal, said detecting means comprising sensors which are strain gauges.

6. An optical apparatus according to claim 5, wherein said detecting means outputs a signal indicative of position or amount of movement of the lens unit.

7. An optical apparatus according to claim 5, wherein said detecting means has a pair of said sensors provided on both surfaces of the resilient member.

8. An optical apparatus, comprising:

a lens unit movable in a direction of optical axis thereof;

a lens barrel;

a driving means for producing a driving force in an optical axis direction, said driving means comprising one of (i) a combination of an electromagnetic coil coupled to said lens unit and a magnetic material coupled to said lens barrel, and (ii) a combination of said electromagnetic coil coupled to said lens barrel and said magnetic material coupled to said lens unit; and a guide for slidably guiding the lens unit relative to the lens barrel, wherein said electromagnetic coil is wound on a bobbin, a yoke extends from said magnetic material, and said guide includes a surface of said yoke which is opposed to said bobbin.

9. An optical apparatus according to claim 8, wherein said guide has a ball bearing between said bobbin and said yoke.

10. An optical apparatus, comprising:

a lens unit movable in a direction of optical axis thereof;

a lens barrel;

a driving means for producing a driving force in an optical axis direction, said driving means comprising one of (i) a combination of an electromagnetic coil coupled to said lens unit and a magnetic material coupled to said lens barrel, and (ii) a combination of said electromagnetic coil coupled to said lens barrel and said magnetic material coupled to said lens unit; and a guide for slidably guiding the lens unit relative to the lens barrel, wherein said electromagnetic coil is wound on a bobbin, and said guide comprises a surface of said magnetic material which is opposed to said bobbin.

* * * * *

UNITED STATES PATENT AND TRADEMARK OFFICE
CERTIFICATE OF CORRECTION

PATENT NO. : 5,289,318

DATED : February 22, 1994

INVENTOR(S) : MASAYOSHI SEKINE, ET AL.

Page 1 of 2

It is certified that error appears in the above-indentified patent and that said Letters Patent is hereby corrected as shown below:

<u>IN THE DRAWINGS</u>

<u>Sheet 14 of 15</u>

"POWEN" should read --POWER--; and "LINEARLITY" should read --LINEARITY--.

<u>COLUMN 2</u>

Line 62, "1band" should read --1$b$ and--.

<u>COLUMN 5</u>

Line 56, "slidden" should read --slid--.

<u>COLUMN 6</u>

Line 7, "51aand" should read --51$a$ and--.

<u>COLUMN 7</u>

Line 50, "far" should read --for--.

<u>COLUMN 8</u>

Line 22, "91asubjected" should read --91$a$ subjected--.

UNITED STATES PATENT AND TRADEMARK OFFICE
CERTIFICATE OF CORRECTION

PATENT NO. : 5,289,318

DATED : February 22, 1994

INVENTOR(S) : MASAYOSHI SEKINE, ET AL.

It is certified that error appears in the above-indentified patent and that said Letters Patent is hereby corrected as shown below:

COLUMN 9

Line 24, "coil 136." should read --coil 36.--.

COLUMN 10

Line 29, "back-lash" should read --backlash--.

Signed and Sealed this

Thirteenth Day of December, 1994

Attest:

BRUCE LEHMAN

Attesting Officer     Commissioner of Patents and Trademarks